United States Patent

[11] 3,593,159

[72] Inventors Daniel E. Kaplan
Los Altos Hills;
Robert M. Hill, Palo Alto; Gabriel F. Herrmann, Los Altos Hills; Stephen K. Ichiki, Los Altos Hills, all of, Calif.

[21] Appl. No. 786,078
[22] Filed Dec. 23, 1968
[45] Patented July 13, 1971
[73] Assignee Lockheed Aircraft Corporation
Burbank, Calif.

[54] RF ECHO APPARATUS
11 Claims, 5 Drawing Figs.

[52] U.S. Cl. .......... 330/63, 329/200, 330/5, 330/53, 333/14, 333/31, 340/173 NC
[51] Int. Cl. .......... H03f 9/00
[50] Field of Search .......... 330/4.6, 4.8, 207.5; 340/173 NC

[56] References Cited

UNITED STATES PATENTS

| | | | |
|---|---|---|---|
| 3,324,461 | 6/1967 | Kaplan | 340/173 NC |
| 2,970,274 | 1/1961 | Poole et al. | 330/4.8 |
| 3,164,768 | 1/1965 | Stiglitz et al. | 330/4.8 |
| 3,215,944 | 11/1965 | Matthews | 330/4.8 |
| 3,244,993 | 4/1966 | Schloemann | 330/4.8 |
| 3,283,167 | 11/1966 | Schaug-Pettersen et al. | 330/4.8 |
| 3,379,985 | 4/1968 | Matsuno | 330/4.8 |
| 3,445,774 | 5/1969 | Sparks et al. | 330/4.8 |

OTHER REFERENCES

Kaplan et al., " Physical Review Letters," 20 May 1968, 1156— 1158. 30-4.8

Rezende et al., " Applied Physics Letter," 15 March 1967, pp. 184— 186

Comstock et al., " Journal of Applied Physics," Oct. 1966, pp. 4077— 4082.

Damon et al., " Applied Physics Letters," May 15, 1965, pp. 194— 196.

Damon et al., " Applied Physics Letters," 15 April 1965, pp. 152— 154.

Comstock et al., " Proc. IEEE," Sept. 1965, pp. 1270— 1271.

*Primary Examiner*—Roy Lake
*Assistant Examiner*—Darwin R. Hostetter
*Attorneys*—H. Donald Volk and George C. Sullivan

ABSTRACT: RF echo apparatus in which the echo signal pulse is amplified with respect to the signal pulse, such apparatus being characterized by broadband, high signal-to-noise operation at room temperatures and being particularly useful in various forms of signal processing such as, for example, delaying, amplifying, detecting, compressing and expanding RF pulses. These characteristics are obtained by a new echo forming mechanism in which the sample is characterized by collective particle oscillation modes which are substantially localized with a nonlinear coupling between modes. Such coupling introduces a mode instability during the drift period prior to echo which causes amplification of the echo pulse. In the example described in detail, the sample is the form of a ferrite having structural discontinuity with pulses being coupled to and from the sample through a broadband slow wave structure.

INVENTORS.
DANIEL E. KAPLAN
ROBERT M. HILL
GABRIEL F. HERRMANN
STEPHEN K. ICHIKI

BY George C. Sullivan
Agent

H. Donald Volk
Attorney

INVENTORS.
DANIEL E. KAPLAN
ROBERT M. HILL
GABRIEL F. HERRMANN
STEPHEN K. ICHIKI
BY George C. Sullivan
Agent
H. Donald Volk
Attorney

RF ECHO APPARATUS

BACKGROUND OF THE INVENTION

An echo signal may generally be described as an RF pulse signal radiated upon the temporary buildup of a macroscopic electric or magnetic dipole moment in a sample, resulting from the prior application of RF pulses to the sample. Many proposals have been made for using echo signal apparatus for such purposes as storing, delaying, compressing or expanding RF pulses. However, the limited bandwidth of such apparatus, and the low signal-to-noise ratio of such apparatus at room temperature, have limited the use of echo signal techniques in practical devices. Heretofore, these limitations were considered to be fundamental to the nature of the physical mechanisms which produced the echo signal. As used in the specification and claims, the term "RF" is used to include the microwave portion of the frequency spectrum as well as the lower frequency portion associated with the term "RF" in the more restrictive sense.

We have discovered a new mechanism for producing echo signals, first reported by us in the article "Amplified Ferrimagnetic Echoes" appearing in the May 20, 1968 issue of *Physical Review Letters*, volume 20, number 21, pages 1156—1158, which overcomes these limitations by providing amplified echo signals over a broad bandwidth and at room temperature.

The samples giving rise to echo signals in accordance with the present invention are characterized by collective particle oscillation modes which are substantially localized in the sample with a nonlinear coupling between modes. Examples of such samples are a ferrimagnet with exchange coupling, and a plasma with coupling by thermal-acoustical or electromagnetic interactions. Such coupling results in a new echo forming mechanism which introduces a mode instability during the drift period prior to the echo, said instability providing an echo signal with the previously unobtainable property of gain or amplification.

SUMMARY OF THE INVENTION

In accordance with the present invention, improved RF echo apparatus is provided which exhibits broadband, high signal-to-noise operation at room temperature and which is particularly useful in various forms of signal processing such as, for example, delaying, amplifying, detecting, compressing and expanding RF pulses, said apparatus having a sample characterized by collective particle oscillation modes which are substantially localized in the sample with a nonlinear coupling between modes.

DESCRIPTION OF DRAWING

The various features and advantages of the present invention will become more apparent upon a consideration of the following description, taken in connection with the accompanying drawing, wherein.

DESCRIPTION OF PREFERRED EMBODIMENTS

Figure 1:
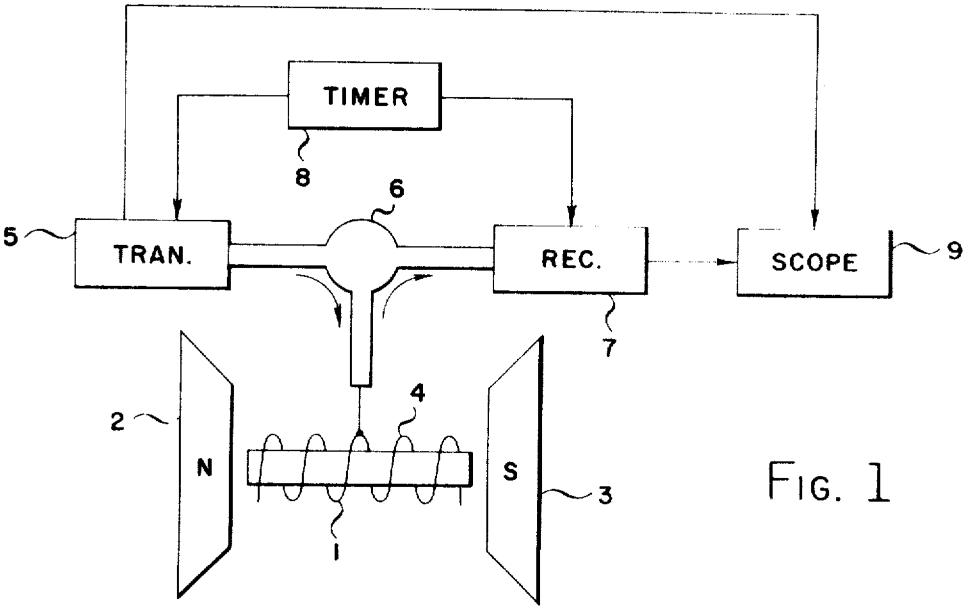
FIG. 1 is a block diagram of RF echo apparatus in accordance with the present invention, wherein the sample is a ferrite with structural discontinuity coupled to a slow-wave structure.

The sample conditions according to the present invention may be analyzed by considering a model in which any given mode of frequency $\omega_n$ couples most strongly to other modes whose frequencies are within an effective frequency range $\omega_n-\sigma<\omega<\omega_n+\sigma$. The product $\sigma\tau$, where $\tau$ is the time interval between successive applied pulses, provides a measure for the relative phase drift in this group of modes during the waiting period preceding the echo. If this parameter is very large echoes are suppressed. If it is very small the modes may be regarded as localized and single particle models apply. It will be shown that possibility of echo amplification appears in a nondissipative system when $\sigma\tau\sim 1$.

As the simplest example consider a large set of equally spaced modes at frequencies $\omega_n=\omega_0+n\Omega$ where $\Omega$ is a small frequency increment. Let the modes be all of identical shape $\Phi_n=\Phi(x-x_n)$, where $x$ can be any parameter characterizing the system, for example distance. For simplicity choose the unit of length so that $x_n=n$. If $\Delta x$ is the spatial spread of a mode then the frequency range within which modes couple to each other equals $\sigma=\Omega\Delta x$.

The lowest order oscillator equation with anharmonic terms relevant to this problem may be put in the form $$a_n=i\omega_n a_n+iq\sum_{n_1 n_2 n_3} C(nn_1n_2n_3)\,a_{n1}a_{n2}n^*_{n3} \qquad (1)$$

where $a_n$ is the mode amplitude and $q$ is a constant. For the simplest form of nonlinear interaction, $C(nn_1n_2n_3)$ is given by a four-fold overlap integral of the form $$\int\Phi^*(x-n)\,\Phi(x-n_1)\,\Phi(x-n_2)\,\Phi^*(x-n_3)\,dx.$$

A uniform excitation of this system of coupled modes by a large pulse, drives the system into an unstable regime in which certain small disturbances can grow exponentially. In the amplified echo application, the excitation of the medium into this unstable regime is effected by the second pulse, while the small disturbance associated with the first pulse is caused to grow.

Two reinforcing processes related by positive feedback give rise to the instability. For $q>0$ these processes are:

1. An oscillator whose amplitude exceeds the average amplitude of neighboring modes will experience an increase in its phase angle relative to the average of these neighboring modes.
2. An oscillator whose phase angle exceeds the average phase angle of neighboring modes will grow in amplitude by receiving energy from these modes.

For $q<0$ the processes are similar except that the changes in phase angle must be taken in a direction opposite to those which we have given for $q>0$. For either $q<0$ or $q>0$, a perturbation of a mode in either amplitude or phase will grow in an unstable manner. In order for the reinforcing processes to operate effectively in the echo application it is required that the parameter $\sigma\tau$ be neither too large nor too small.

We will now consider the response of this system to a pulse sequence consisting of a very weak pulse at $t=0$ followed by a strong pulse at $t=\tau$. Let pulse 1 impart to each mode an amplitude $\epsilon$ and pulse 2 an additional amplitude increment $A$. Immediately following the incidence of the second pulse the amplitude of the $n$'th mode is $$a_n(\tau)=\epsilon \exp i\omega_n\tau+A. \qquad (2)$$

These initial conditions introduce a periodicity in $n$ equal to $N=2\pi/\Omega\tau$. The echo amplitude at $t=2\tau$ can be therefore defined as $$a_{\mathrm{echo}}=\frac{1}{N}\sum_{n-1}^{N}a_n(2\tau) \qquad (3)$$

Before linearizing with respect to $\epsilon$ one must abstract the zero'th order solution (i.e., the solution for $\epsilon=0$) by putting $$a_n=\bar{a}_n \exp i[\omega_0+\mathrm{in}\Omega)\,(t-\tau)+qA^2F] \text{ where}$$

$$F=\int_0^{1-\tau}\Sigma C(nn_1n_2n_3)\,\exp i(-n+n_1-n_3)\Omega' dt'$$

One may now put $\bar{a}_n=A+b_n\epsilon$, substitute into (1), and retain only first order terms in $\epsilon$. Additional simplification is achieved by making use of the periodicity and introducing at this point the Fourier sum $$b_n=\sum_m u_m \exp i\Omega\tau nm$$

where summation is over a period of length $N$. The initial conditions (2) become simply $u_1(\tau)=1$, $u_m(\tau)=0$ for $m\neq 1$ while the desired echo amplitude (3) is $|a_{echo}|=\epsilon|u_{-1}(2\tau)|$. The incident "signal" is thus represented by $u_1$ and the echo disturbance by $h_{11}$.

With the above substitutions one obtains a set of equations in which a given $u_m$ is coupled only to $u_{1m}$. The equations for $u_1$ and $u_{11}$ are $$\dot{u}_1=iqA^2\{|F(t-\tau)|^2[2|F(t)|^2 - |F(t-\tau)|^2]u_1+F(t-\tau)^2F^*(t)F^*(t-2\tau)u^*_{-1}\}$$

$$\dot{u}_{-1}=iqA^2\{|F(t-\tau)|^2[2|F(t-2\tau)|^2 - |F(t-\tau)|^2]u_{-1}+F(t-\tau)^2F^*(t)F^*(t-2\tau)u^*_1\} \qquad (4a)$$

Where $$F(t)=\sum_n \phi(n) \exp(-i\Omega nt) \qquad (4b)$$

If $\Phi(n)$ has a reasonably well behaved form, then $F(t)$ declines rapidly for $t>>1/\sigma$. The qualitative behavior of the solution can be deduced entirely from this property but is more easily displayed if we choose the mathematically convenient Gaussian form $$\Phi(n)=[\Omega/\sigma(2\pi)^{1/2}] \exp[-(\Omega n)^2/2\sigma^2].$$

On substituting integration for summation we then have $F(t)=\exp -\sigma^2t^2/2$ and $$\dot{u}_1=iqA^2 \exp-\sigma^2(t-\tau)^2\{[2 \exp-\sigma^2t^2 - \exp-\sigma^2(t-\tau)^2)]u_1+\exp-\sigma^2[(t-\tau)^2+\tau^2]u^*_{-1}\} \qquad (5a)$$

$$\dot{u}_{-1}=iqA^2 \exp-\sigma^2(t-\tau)^2\{[2 \exp-\sigma^2(t-2\tau)^2 - \exp-\sigma^2(t-\tau)^2\}u_{-1}+\exp-\sigma^2[(t-\tau)^2+\tau^2]u^*_1\} \qquad (5b)$$

The approximate character of the solution can be determined for the initial period following the second pulse, that is, for $t-\tau<<1$. There are three regimes of interest.

1. $\sigma\tau<<1$. $u_1\cong 1+iqA^2t$, $u_{11}\cong iqA^2t$.

This corresponds to the uncoupled mode limit and represents an amplitude dependent phase drift which is proportional to time.

2. $\sigma\tau$ intermediate, e.g. choose $\exp -\sigma^2\tau^2=½$. Then $u_1\cong\cosh ½qA^2t$, $u_{11}\cong i \sinh ½qA^2t$. The solutions are of the unstable, growing type and may lead strongly amplified echoes.

3. $\sigma\tau>>1$. $u_1$ and $u_{11}$ are uncoupled and no echo occurs.

Usually $\sigma$ is fixed and the above sequence therefore represents the variation of the echo with increasing time interval. As the time interval $\tau$ is increased from a minimum value, the echo amplitude rises in an exponential manner to a peak at times for which $\sigma\tau$ 1, and then decays monotonically. This predicted behavior is indeed typical of that observed from echoes in ferrite samples.

One specific example of an apparatus for obtaining echo signals in accordance with the present invention will now be described by reference to FIG. 1.

A ferrite sample 1 of single-crystal yttrium iron garnet, in the form of a rectangular bar 2 mm. by 2 mm. in cross section by 5 mm. in length, is placed lengthwise between the poles 2 and 3 of permanent magnet of approximately 4000 gauss field strength, and inside a five-turn helical coil 4. A microwave transmitter at a frequency of 10 GHz. is coupled via a microwave circulator 6 to the sample coil 4, and the coil 4 is, in turn, coupled via the circulator 6 to a microwave receiver 7. A timer 8 serves to gate on the transmitter 5 for application of a pulse sequence after which the receiver 7 is gated on to receive the echo signal from the sample 1. A scope 9 is coupled to the transmitter 5 and the receiver 7 in order to present a visual representation of the transmitted and received pulses.

Figure 2:
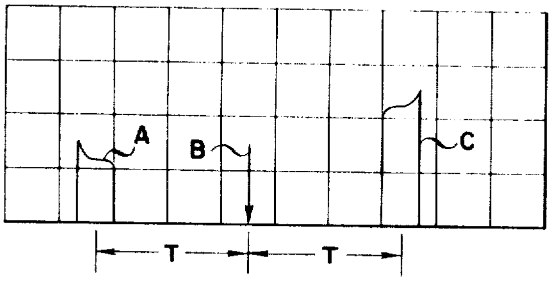
FIG. 2 is an oscilloscope trace showing the two-pulse echo pulse sequence in the apparatus of FIG. 1.
Figure 3:
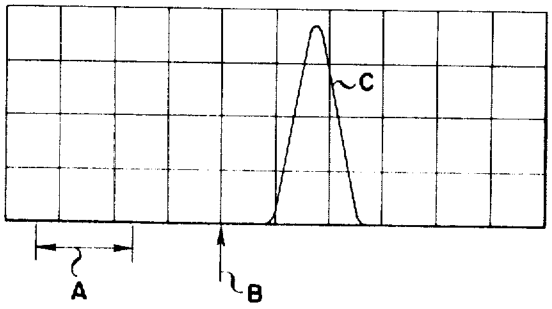
FIG. 3 is an oscilloscope trace showing the echo amplitude envelope as a function of pulse interval in the apparatus of FIG. 1.

FIG. 2 shows the recording obtained on scope 9 from the application of a typical pulse sequence in which two transmitter pulses A and $B$, separated by an interval $\tau$, are applied to the sample 1 and an echo pulse C is received at a time $\tau$ after application of pulse B. Each interval along the horizontal axis is 0.1 microsecond. The pulse A has been amplified externally by $10^3$ for comparison, and the pulse B which is 10 nanoseconds in duration has been electronically blanked in order to simplify the display. FIG. 3 shows the echo envelope obtained by multiple exposure of the scope for a variable pulse separation as indicated by the extent of the double-headed arrow for initiation of pulse A, with each interval along the horizontal axis being 0.4 microseconds.

Figure 5:
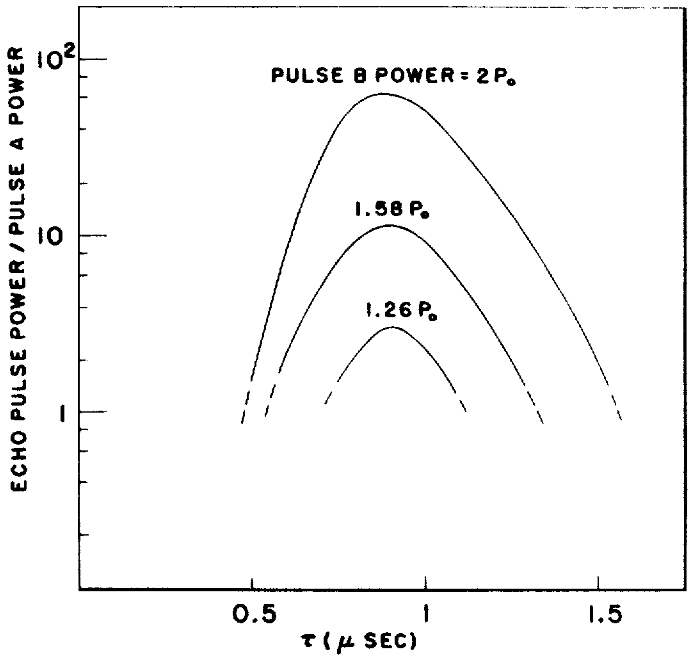
FIG. 5 is a series of echo amplification vs. pulse interval curves for different recall pulse powers, as actually measured with the apparatus of FIG. 1.
Figure 4:
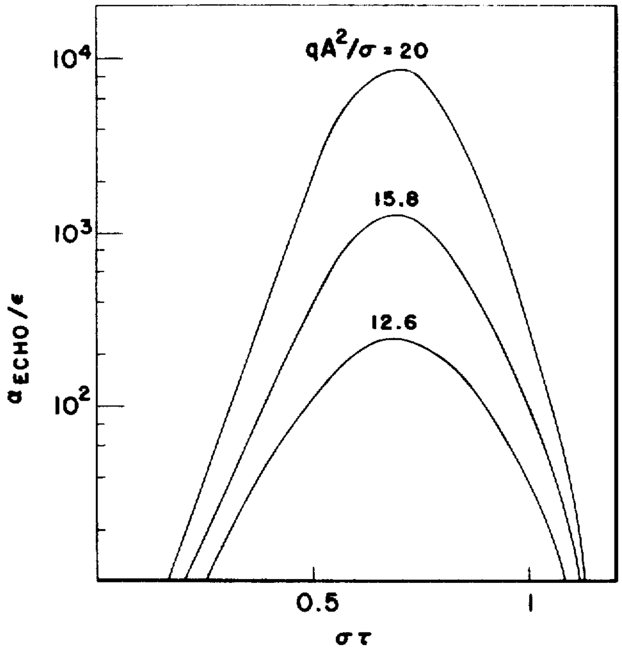
FIG. 4 is a series of echo amplification vs. pulse interval curves for different recall pulse powers, calculated from an analysis of the mode interaction phenomena on which the present invention is based.

Returning now to equations (5*a*) and (5*b*), given above, a series of solutions for the echo amplification $a_{echo}$ as a function of the mode overlap parameter $\sigma\tau$ (using the Gaussian mode shape and these equations) for different levels of the pulse B power parameter $qA^2/\sigma$ is shown in FIG. 4. The corresponding echo amplification (ratio of C power to A) actually measured in the apparatus of FIG. 1 as a function of pulse interval $\tau$ for different pulse B powers ($P_o$ being approximately 1 watt with a pulse duration of 10 nanoseconds) is shown in FIG. 5. The similarity between the theoretical curves of FIG. 4 and the experimental curves of FIG. 5 is particularly evident in the exponential character of the growth part of the curves and in the large variation with pulse B power. The lack of agreement in the decaying portion of the curves is evidently due to relaxation processes unrelated to the echo formation mechanism.

The characteristics of these echo signals contrast dramatically with echo signals previously obtained from ferrite samples in which the echo is always smaller than that of either exciting pulse, and in which the echo decays monotonically with pulse separation. It is particularly significant that such prior art apparatus used spherical and disc-shaped samples having highly uniform internal fields; see for example, the article by coinventor D. E. Kaplan entitled "Magnetostatic Mode Echo in Ferromagnetic Resonance" appearing in the Feb. 22, 1965 issue of *Physical Review Letters*, volume 14, number 8, pages 254—256. In the present invention, the sample has a configuration with structural irregularity or discontinuity, such as a bar with sharp corners, a sphere with abrupt flat portions formed in the surface, or rough chips. Amplified echoes, with nonmonotonically varying envelopes, have been observed by us with ferrite samples of each of these configurations. The varying internal fields created by such discontinuities result in spin modes which are substantially separated in space with a nonlinear coupling which results in mode-instability amplification during the drift period after application of pulse $B$.

In order to excite a large number of magnetostatic modes and obtain strong coupling to the sample 1 over a wide band of frequencies, the sample coupling circuit is in the form of a low-$Q$ show wave structure, such as a helix. The low homogeneity required for the external field permits the convenient use of a small permanent magnet to provide the DC magnetic field. It is apparent, however, that an electromagnet may also be used for this purpose.

With the above-described apparatus operating at room temperature, echo signals were obtained over the frequency range 8.2 to 12.4 GHz. with the intensity of the echo signal C being a factor of $10^3$ to $10^5$ greater than the intensity of the A pulse. The peak power of the second pulse for maximum amplification was typically 1—5 watts with a duration of 10—100 nanoseconds. As much as 0.1 percent of the power of pulse B was returned in echo pulse C.

Used as a microwave delay device, the maximum signal delay time $\tau$ over which gain is obtained exceeds 1.5 microseconds (for longer times, relaxation effects prevent the attainment of gain). This maximum delay time may be extended by repetitive application of the recall pulse B at intervals which are less than this maximum delay time. The application of such repetitive application of recall pulses also increases the amplification up to the saturation limit for the amplifying process. Such apparatus can also be useful as a source of amplified RF pulses.

The amplification of pulses in accordance with the present invention proceeds with the introduction of minimal frequency and amplitude noise. Signals at power levels only slightly above thermal noise are thus amplified above the noise. For example, with the apparatus described with reference to FIG. 1, the threshold sensitivity for signal detection is of the order of −85 dbm (within 10 db. of thermal noise) for signals with frequency bandwidth in excess of 100 MHz. Accordingly the apparatus may be used as a sensitive microwave pulse receiver or detector. In this regard, the gain bandwidth of the apparatus may be sweeped by varying the frequency of the recall pulse B and/or the strength of the DC magnetic field in order to identify the frequency of an incoming pulse.

It should particularly be noted that the above-discussed properties of the present invention are unique and new in that amplification, delay, and detection functions are obtained at ambient (room) temperature at frequencies throughout the microwave spectrum. Of prime significance is operation in a range of frequencies at which other means of delaying pulsed signals either require an ultra low temperature cryogenic environment (T~1.5°K.) to achieve amplification, or are subject to an insertion loss of order 90 db./microsecond at ambient temperatures, or require a volume per microsecond delay time at least 10,000 times larger than the present invention. The combined functions of delay, amplification and detection accomplished by the present invention in the microwave frequency range, at minimal volume, are without parallel in present technology.

Apparatus for obtaining echoes in accordance with the present invention may also, for example, be used to advantage in obtaining expansion and compression of pulses. In order to utilize this echo phenomenon for pulse time compression purposes a monotically varying frequency modulation function is applied to the initial signal pulse A, which may have an arbitrarily long duration, subject only to limitations imposed by the phase relaxation of the sample material. Following a waiting period after termination of the signal pulse, the recall pulse B is applied with time duration one-half that of the signal pulse. The carrier frequency of this pulse is also varied in the same functional manner as the frequency variation of the signal pulse. The total frequency excursion of both pulses is adjusted to be identical. To obtain maximum time compression the limit of this frequency excursion is adjusted to encompass the frequency extremes of the physical resonance of the sample. The recall pulse generates a time compressed echo of the signal pulse. To illustrate the formation of this time compressed echo in a simplified manner one may envision the frequency modulated signal pulse and frequency modulated recall pulse to themselves constitute a succession of many short pulses, each of fixed frequency, progressing over the limits of the total frequency sweep of each long pulse. Paring of each short signal pulse with a corresponding short recall pulse of the same frequency results in the generation of echoes of each short signal pulse which are coincident in time. For a signal A of duration $t_1$, a pulse interval of $\tau$, and a recall pulse B duration of $t_1/2$, the echo C will occur at a time $\tau+t_1/2$ following cessation of the recall pulse. The entire frequency spectrum contained in the long frequency modulated signal pulse is now present in the time compressed echo. The time width of this echo is inversely related to the breadth of this spectrum.

A distinguishing and advantageous feature of the type of echo pulse resonance utilized for obtaining this time compression is the absolute bandwidth of frequency response for a specimen in a fixed magnetic field. This spectrum may encompass 500 MHz. at magnetic field values that place the resonance within microwave X-band. This instantaneous bandwidth may well be extended to values substantially in excess of 1 GHz. by such techniques as introduction of strong gradients into the external magnetic field, or by suitably shaping a ferromagnetic sample in a manner that will produce extensive variations in the internal demagnetizing fields. Previously obtainable bandwidths were in the range of 300—500 MHz. A further distinguishing and advantageous feature, in the case of a ferromagnetic sample, is the ferromagnetic relaxation time which determines the upper limits to the length of the signal and recall pulses and to their spacing. In conjunction with the physical bandwidth, this determines the maximum obtainable time compression factor. These relaxation times are sufficiently long at room temperatures and X-band microwave frequencies to produce time compression factors of 200 or more.

A still further distinguishing and advantageous feature of the described ferromagnetic time compression system is that it uniquely permits the utilization of an efficient, broadband, slow-wave coupling circuit, such as the helix of FIG. 1, to transfer energy from the transmission line to the active material without imposing bandwidth limitations due to resonant properties of the coupling structure.

Time compression of frequency modulated or "chirped" pulses is a well-known technique for achieving high range resolution or range and velocity resolution in radar systems by greatly increasing the effective duty cycle of the radar; see, for example, the article by W.B. Mims entitled "The Detection of Chirped Radar Signals by Means of Electron Spin Echoes" appearing in the Aug. 1963 issue of *The Proceedings of the IEEE*, pages 1127—1134. This increase in duty cycle is associated with long "chirped" signal pulses which, when suitably compressed, result for example in radar echoes with high time definition. The present invention also permits the advantageous accomplishment of the following functions:

1. The generation of extremely short pulses, regarding the time-compressed echo itself as a signal pulse. This technique can permit the generation of microwave pulses of minimum time duration not readily obtainable by other techniques.
2. The time expansion of a short signal pulse with an inherently broad Fourier spectrum. In this embodiment an initial short signal pulse A, subject to no additional frequency modulation, is followed at a time $\tau$ by a relatively long recall pulse B of duration $t_1$. The recall pulse is subject to a monotonic carrier frequency modulation with excursion appropriate to the spectrum of the short signal pulse. The resulting echo C is of duration $2t_1$ and is initiated at a time $\tau$ following the leading edge of the recall pulse ($\tau>t_1$). The entire frequency content of the signal pulse is present in the echo, now ordered in time in a manner determined by the functional form of the frequency modulation of the recall pulse. This time expansion function has application for radar target studies of objects with radar cross sections that are a strong function of frequency. The variation of radar cross sections with frequency is then presented in the time domain. The time expansion function may also be applied as a means of efficient spectroscopy of broadline resonant systems with an absorpotion characteristic that varies rapidly with frequency.

The echo signal described with reference to FIG. 2 is known as a two-pulse echo in that the echo signal appears after the application of two pulses and at a time equal to the spacing between the two pulses. The apparatus described with reference to FIG. 1 has also exhibited an amplified three-pulse echo, which echo also exhibits a nonmonotonic envelope as a function of the pulse interval determining the time at which the echo signal appears. The three-pulse echo occurs at a time following the third pulse (in a sequence of three pulses) equal to the interval between the first and second pulses under conditions such that the interval between the second and third pulse is greater than the interval between the first and second pulse.

As will now be apparent to those skilled in the art, we have provided a versatile signal correlation device which is generally useful in a variety of signal processing applications in addition to those specifically described. Such applications would include, for example, signal pulse-time multiplexing and signal encoding and decoding.

While several forms of this invention have been disclosed it is understood that this more detailed description is given by way of illustration and explanation only and not by way of limitation, since various changes therein may be made by those skilled in the art without departing from the scope and spirit of this invention.

Having thus described the invention, what we claim is:

1. An RF echo apparatus wherein an RF pulse echo signal is obtained from the temporary buildup of a macroscopic dipole moment in a sample as a result of the prior application of RF pulses to said sample, the improvement comprising: a sample characterized by collective particle oscillation modes which are substantially localized in the sample with a nonlinear coupling between modes.

2. The invention according to claim 1, wherein any given one of said modes of frequency $\omega_n$ couples to other said modes within an effective frequency range $\omega_n-\sigma<\omega<\omega_n+\sigma$, and wherein the product $\sigma\tau$ is on the order of unity, where $\tau$ is the time interval between applied pulses which determines the time at which the echo pulse occurs.

3. The invention according to claim 2 wherein the echo pulse is amplified with respect to the applied signal pulse and wherein the envelope of echo signal amplitude as a function of $\tau$ is nonmonotonic.

4. The invention according to claim 1 wherein said sample is a ferrite and said modes are spin modes of said ferrite.

5. The invention according to claim 4 including an RF slow wave structure for coupling pulses to and from said ferrite sample 6. The invention according to claim 5 wherein said slow wave structure is a helix surrounding said sample 7 The invention according to claim 4 wherein said ferrite sample has a configuration with structural discontinuity.

8. A method of obtaining an RF pulse echo signal which comprises the steps of: substantially localizing collective particle oscillation modes of a sample with nonlinear coupling between said modes; applying RF pulses to said sample to introduce an instability of said modes and consequent temporary buildup of a macroscopic dipole moment in said sample; and obtaining an RF pulse signal from said macroscopic moment.

9. The invention according to claim 1, wherein any given one of said modes of frequency $\omega_n$ couples to other said modes within an effective frequency range $\omega_n-\sigma<\omega<\omega_n+\sigma$, and wherein the product $\sigma\tau$ is on the order of unity, where $\tau$ is the time interval between applied pulses which determines the time at which the echo pulse occurs.

10. The invention according to claim 9 wherein the echo pulse is amplified with respect to the applied signal pulse and wherein the envelope of echo signal amplitude as a function of $\tau$ is nonmonotonic.

11. The invention according to claim 8 wherein said sample is a ferrite and said modes are spin modes of said ferrite.